United States Patent
Ozbaysal et al.

(10) Patent No.: US 7,985,307 B2
(45) Date of Patent: Jul. 26, 2011

(54) TRIPLE PHASE TITANIUM FAN AND COMPRESSOR BLADE AND METHODS THEREFOR

(75) Inventors: Kazim Ozbaysal, Cincinnati, OH (US);
William Houchens, Loveland, OH (US);
William Miller, Fairfield, OH (US);
Jesse Moses, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 601 days.

(21) Appl. No.: 12/129,779

(22) Filed: May 30, 2008

(65) Prior Publication Data
US 2009/0255609 A1 Oct. 15, 2009

Related U.S. Application Data

(60) Provisional application No. 61/043,933, filed on Apr. 10, 2008.

(51) Int. Cl.
*C22F 1/18* (2006.01)
*C21D 1/09* (2006.01)
*C22C 14/00* (2006.01)
(52) U.S. Cl. ......... 148/669; 148/525; 148/421; 148/526
(58) Field of Classification Search ............. 148/669, 148/525, 421, 526
See application file for complete search history.

(56) References Cited

U.S. PATENT DOCUMENTS
6,814,818 B2 11/2004 Woodfield et al.
6,814,820 B2 11/2004 Ozbaysal

OTHER PUBLICATIONS

Venkatesh et al., An Experimental Investigation of Fretting Fatigue in Ti-6Al-4V: The Role of Contact Conditions and Microstructure, Metallurgical and Materials Transactions A, vol. 32A, May 2001, p. 1131-1146.

*Primary Examiner* — Roy King
*Assistant Examiner* — Jessee R. Roe
(74) *Attorney, Agent, or Firm* — General Electric Company; Marcella R. Louke

(57) ABSTRACT

Article (e.g., turbine engine fan or compressor blade) comprising a titanium alloy has a first portion with alpha+beta microstructure and a second portion with martensitic or a bimodal microstructure. The modified microstructure of the second portion is provided by selectively heating, and immediately quenching, the second portion without substantially heating the first portion. An exemplary method includes providing a near net-shaped article having a first portion (e.g., an airfoil region) and a second portion (e.g., an unfinished dovetail region). Initially, the article comprises an alpha+beta microstructure throughout. Thereafter, the second portion is selectively heated, followed by immediate quenching, without substantially heating the first portion, to modify the microstructure of the second portion to a martensitic or bimodal microstructure without substantially modifying the microstructure of the first portion. Thereafter, the second portion may be processed to a final body dimension.

15 Claims, 5 Drawing Sheets

$\alpha + \beta$
HRc > 36

$\alpha'$
HRc > 47

$\alpha + \beta + \alpha'$
HRc > 47

TRIPLE PHASE TITANIUM FAN AND COMPRESSOR BLADE AND METHODS THEREFOR

CROSS-REFERENCE TO RELATED APPLICATIONS

This application claims priority to U.S. Provisional Application Ser. No. 61/043,933, filed Apr. 10, 2008, which is herein incorporated by reference in its entirety.

BACKGROUND OF THE INVENTION

This invention relates generally to articles formed from titanium alloys, and more specifically to articles having varying microstructures in pre-selected regions and methods therefore.

Titanium fan and compressor blade dovetails are susceptible to fretting and edge of contact (EOC) fatigue failures at the dovetail/disk slot contact location due to high contact stresses. Exemplary compressor blade dovetail fatigue failures are due to a) loss of wear coating on the dovetail surface, b) lever arm failures, c) vane bushing failures, and d) stick/slip condition with the mating titanium spool.

One approach used to address the problem of premature fatigue failure is replacement of a Ti6Al4V alloy with Ti4Al4Mo2Sn (Ti442) alloy. This high strength alloy considerably reduces dovetail failures. However, recurrence of dovetail failures pose a high cost to business and further reductions in fatigue failure are sought.

Generally, fan and compressor titanium-based blades comprise equiaxed alpha+beta titanium alloys. This microstructure provides a good balance of mechanical properties for the combined airfoil/dovetail structure. It is known in the titanium industry that titanium articles having bimodal (alpha+beta) or martensitic microstructures have superior high cycle fatigue (HCF) properties compared to mill annealed titanium articles. Articles having martensitic or bimodal microstructures are slightly harder and stronger than coarse or slow cooled microstructures. An increase in the hardness and yield strength of the titanium alloys increases the resistance to crack initiation by fatigue. Thus, any improvement in the strength of the titanium alloy increases fatigue resistance including resistance to environmentally- or contact-driven fatigue.

Martensitic and bimodal structures may be obtained through high temperature heat treat followed by water quench. However, the necessary heat treat/quench cycle cannot be applied to a substantially net-shaped airfoil due to dimensional distortion during heat treat and quench. Thus, the heat treat/quench process is not feasible on a complete blade.

Accordingly, it would be desirable to provide the dovetail region of a compressor blade that capitalizes on the high strength and fatigue resistance of bimodal and/or martensitic structure while preserving the airfoil dimension and mechanical properties.

BRIEF DESCRIPTION OF THE INVENTION

The above-mentioned need or needs may be met by exemplary embodiments which provide an article including a body comprising a titanium base alloy. The article includes at least a first portion and a second portion adjacent the first portion. The first portion comprises an alpha+beta microstructure and the second portion comprises a microstructure selected from a martensitic microstructure or a bimodal microstructure. In an exemplary embodiment, the microstructure of the second portion is achieved by selectively heating at least a surface region of the second portion followed by immediate quenching without substantially heating the first portion.

An exemplary embodiment is directed to a method that includes providing a near net-shaped article comprising a body comprising a titanium base alloy. The article includes a first portion and a second portion adjacent the first portion, wherein the near net-shaped article exhibits an alpha+beta microstructure substantially throughout the first and second portions. Thereafter, the second portion is processed to provide a pre-selected region of the second portion with a modified microstructure selected from a martensitic microstructure and/or a bimodal microstructure without substantially modifying the microstructure of the first portion.

An exemplary embodiment is directed to a method that includes providing a near net-shaped article comprising a body comprising a titanium alloy and having a first portion encompassing an airfoil region being shaped to substantially an airfoil final dimension and a second portion encompassing an unfinished dovetail region. The near net-shaped article exhibits an alpha+beta microstructure substantially throughout the first and second portions. Thereafter, at least a surface region of the second portion is selectively heated, followed by immediate quenching without substantially heating the first portion to provide a pre-selected region of the second portion with a modified microstructure selected from a martensitic microstructure and/or a bimodal microstructure without substantially modifying the microstructure of the first portion. Thereafter, the second portion is processed to a final body dimension.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
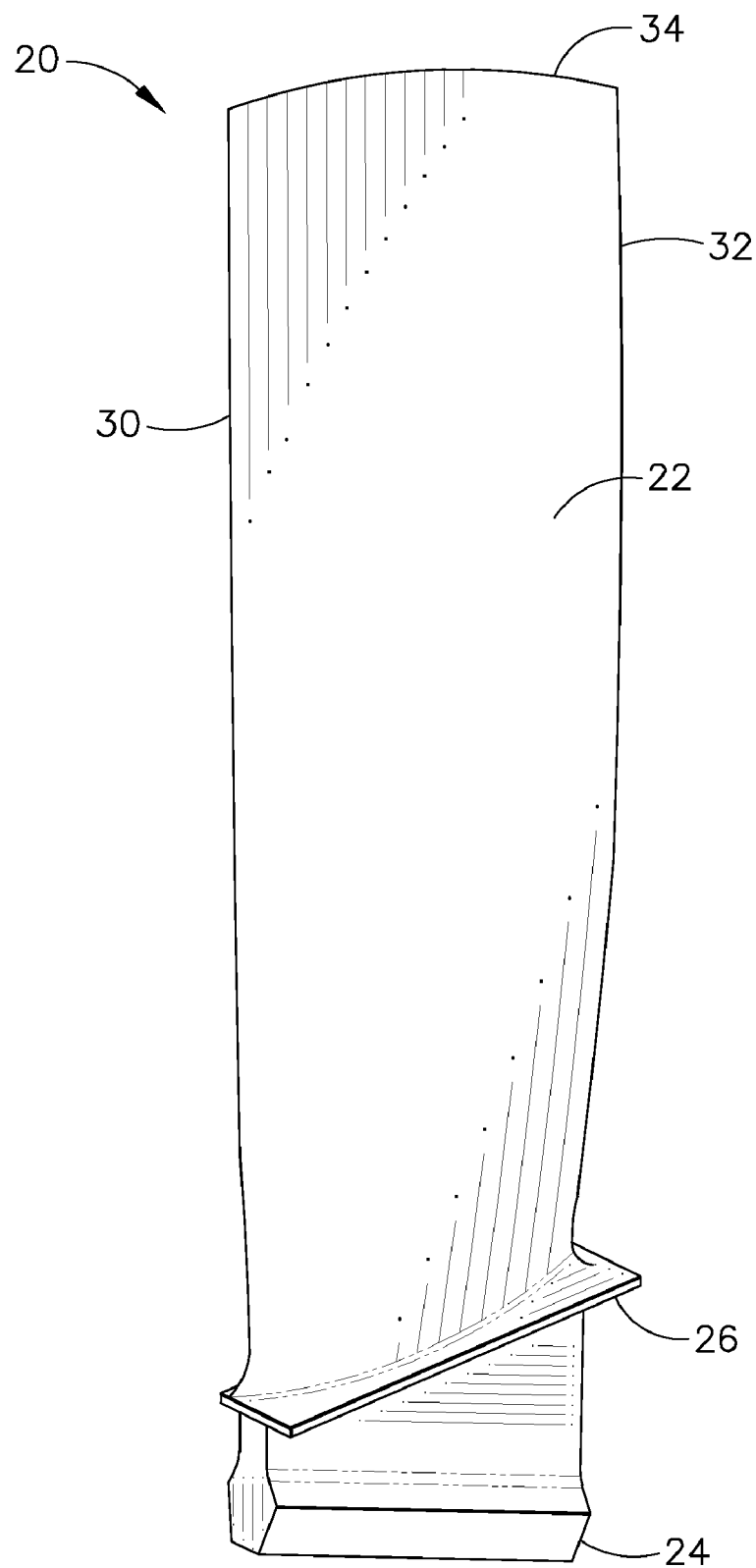
FIG. 1 is a perspective view of a titanium alloy compressor blade.

Referring to the drawings wherein identical reference numerals denote the same elements throughout the various views, FIG. 1 depicts a component article of a gas turbine engine such as a compressor blade 20. The compressor blade 20 is formed of a titanium-base alloy as will be discussed in greater detail below. The compressor blade 20 includes an airfoil 22 that acts against the incoming flow of air into the gas turbine engine and axially compresses the air flow. The compressor blade 20 is mounted to a compressor disk/spool (not shown) by a dovetail 24 which extends downwardly from the airfoil 22 and engages a slot on the compressor disk. A platform 26 extends longitudinally outwardly from the area where the airfoil 22 is joined to the dovetail 24. The airfoil 22 has a leading edge 30, a trailing edge 32, and a tip 34 remote from the platform 26.

The airfoil 22 is relatively thin measured in a transverse direction (i.e., perpendicular to a chord to the convex side drawn parallel to the platform). The dovetail 24 is relatively thick measured perpendicular to its direction of elongation.

The compressor blade 20 is made of a titanium-base alloy, which is an alloy having more titanium than any other element. One particular titanium-base alloy is known as Ti-442, having a nominal composition, in weight percent, of about 4 percent aluminum, about 4 percent molybdenum, about 2 percent tin, about 0.5 percent silicon, balance titanium. Another titanium-base alloy is known as Ti-811, having a nominal composition, in weight percent, of about 8 percent aluminum, about 1 percent molybdenum, about 1 percent vanadium, balance titanium. Another exemplary titanium-base alloy is known as Ti 64, having a nominal composition, in weight percent, of about 6 percent aluminum, about 4 percent vanadium, balance titanium.

Figure 4:
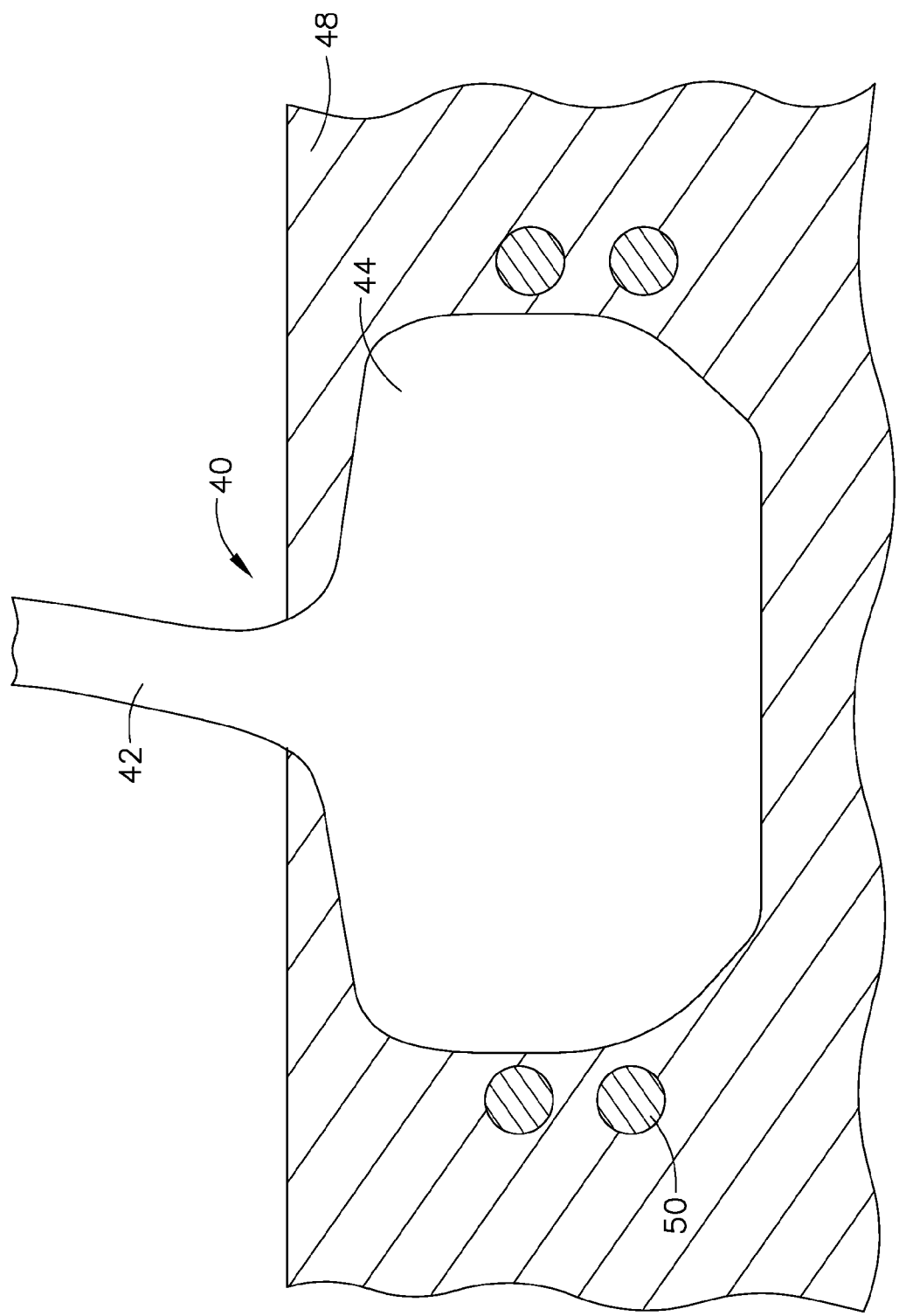
FIG. 4 is a schematic representation of an unfinished dovetail having a modified microstructure and an exemplary induction heating assembly.

In an exemplary embodiment, a near net-shape article is forged from a selected titanium alloy. As used herein, "near net-shape article" means that at least a portion of the article (i.e., the airfoil) has been shaped to substantially its final dimensions, but at least another portion of the article (i.e., the dovetail) has not been finally shaped. In the embodiments disclosed herein, the term "unfinished dovetail" is used to signify the dovetail potion of a near-net shape compressor blade that must still undergo final shaping processes. The unfinished dovetail distorts during the heat treatment/water quenching hardening process. Subsequent to the final forge operation, but prior to final shaping, the near net-shape article undergoes one or more process steps to achieve a desired modified microstructure in the dovetail. FIG. 4 depicts a near net-shape compressor blade 40 including an airfoil 42 and unfinished dovetail 44. Airfoil 42 has an alpha+beta microstructure that is maintained throughout subsequent processing.

Figure 2:
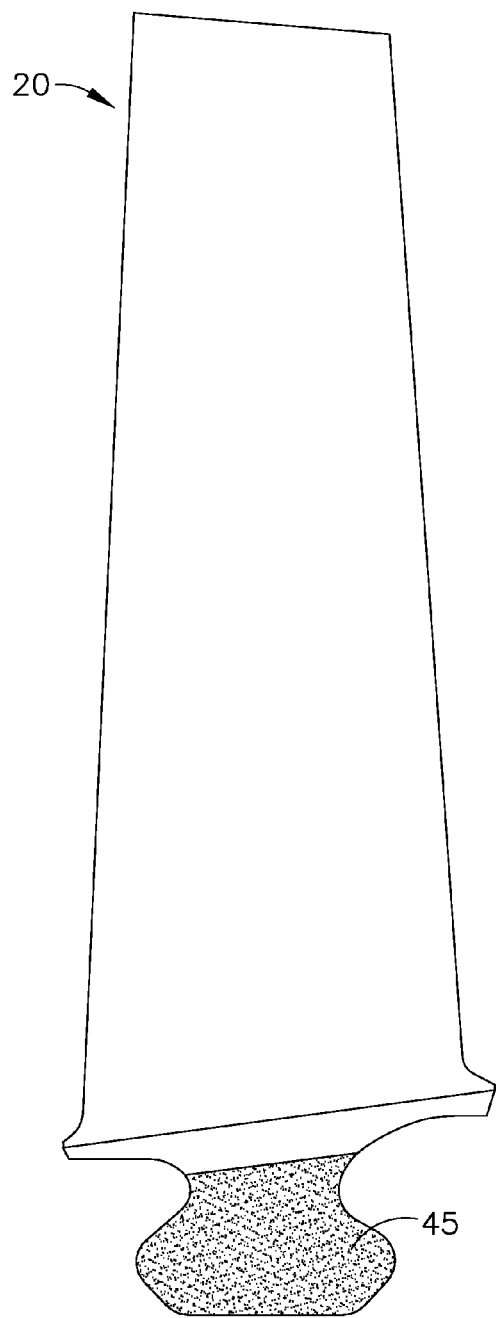
FIG. 2 is a schematic representation of a compressor blade having an unmodified airfoil and a dovetail having a modified microstructure substantially throughout the dovetail thickness.
Figure 3:
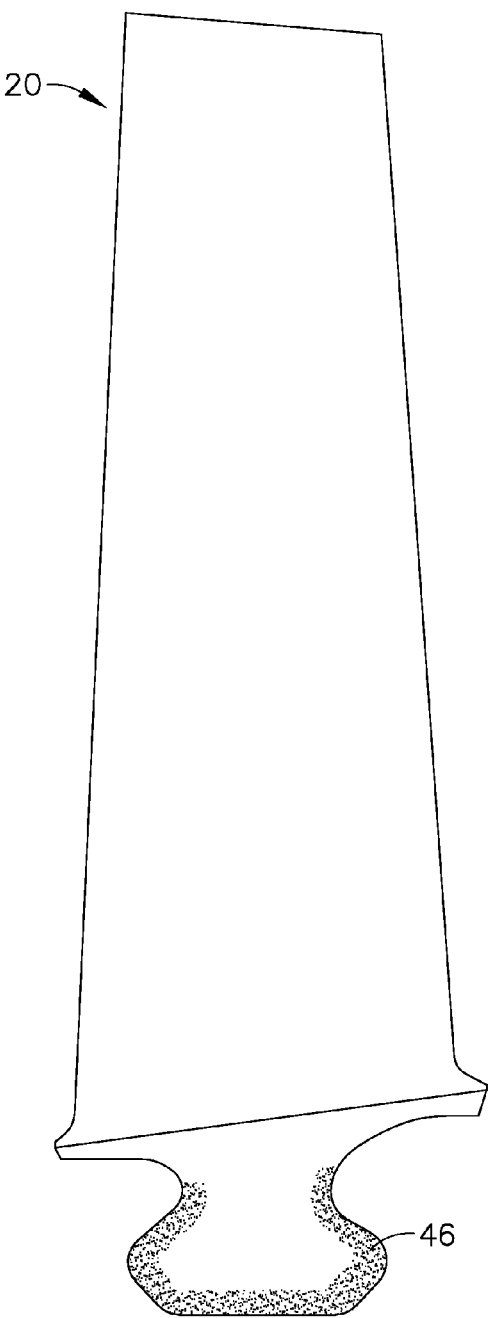
FIG. 3 is a schematic representation of a compressor blade having an unmodified airfoil and a dovetail having a modified microstructure in pre-selected regions.

After achieving the desired alpha+beta phase in the near-net shape article, including airfoil 42, the unfinished dovetail 44 is subjected to one or more selected process steps to attain a modified microstructure in pre-selected regions or throughout the dovetail thickness. In an exemplary embodiment, the modified microstructure 45 includes a martensitic microstructure throughout the dovetail thickness, schematically represented in FIG. 2. In another exemplary embodiment, the modified microstructure 45 includes a bimodal microstructure. The martensitic microstructure 46 may be present at the periphery of the dovetail, referred to herein as "skin depth," schematically represented in FIG. 3. Typically "skin depth" is about 5 to 10 mills in from the outer surface.

Figure 5:
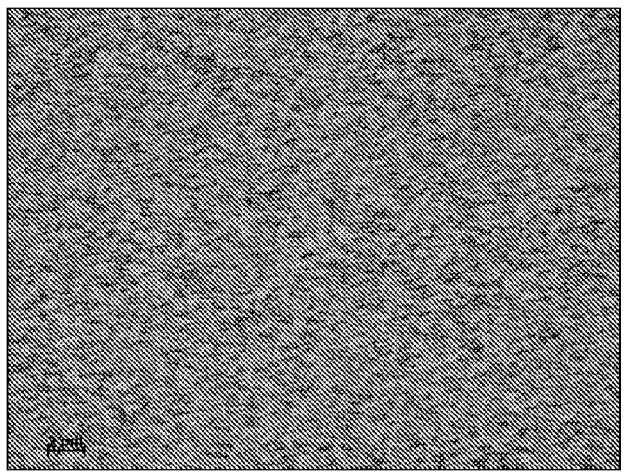
FIG. 5 is a micrograph of a portion of an unmodified airfoil exhibiting annealed alpha+beta microstructure.
Figure 6:
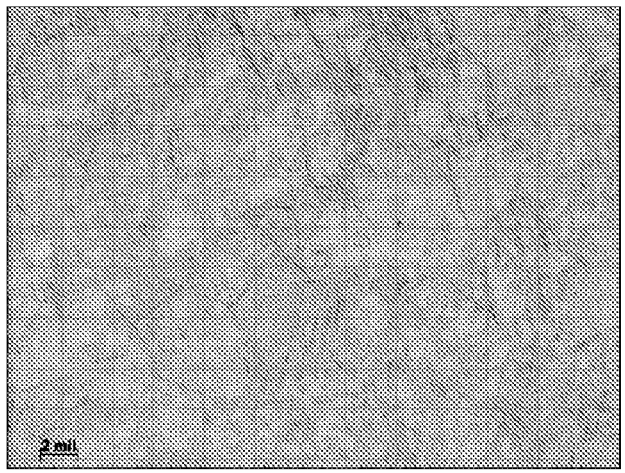
FIG. 6 is a micrograph of a portion of a modified dovetail exhibiting a martensitic microstructure.
Figure 7:
FIG. 7 is a micrograph of a portion of a modified dovetail exhibiting a bimodal (alpha+beta/martensitic) microstructure.

In an exemplary embodiment, the high strength unfinished dovetail 44 is achieved through a heat treatment immediately followed by a water quench. The heat treatment may be provided by induction heating, laser treatment, or electron beam methods. An exemplary apparatus is schematically represented in FIG. 4. An exemplary apparatus includes a hollow ceramic vessel 48 adapted for insertion of the unfinished dovetail 44. In this embodiment, induction heating coils 50 are utilized to provide the requisite heat treatment. Alternate heating methods may be utilized. For example, it is contemplated that laser beams may be utilized to heat pre-selected regions of the unfinished dovetail 44. Alternately, electron beam radiation may be utilized. An important consideration is the rapidity with which the water quench can occur after heating. Those with skill in the art will appreciate that induction heating, laser treatment, or electron beam methods can provide a rapid, controlled heating environment. The temperature and duration of the heat treatment, followed by adequate water quench, impacts the resulting microstructure within the dovetail. For example, heat treatment below the beta solvus temperature, followed by immediate quenching, is a prerequisite for a bimodal microstructure. Heat treatment above the beta solvus temperature, followed by immediate quenching, results in martensitic microstructure. The depth of the modified microstructure (i.e., skin depth) may be dependent on the duration of the heat treatment. In general, only the unfinished dovetail 44 is subjected to the additional heat treatment, thus preserving the alpha+beta structure of the airfoil 42 shown in FIG. 5. FIGS. 6 and 7 respectively show the martensitic microstructure and the bimodal structure achieved in the dovetail according to embodiments disclosed herein.

Figure 8:
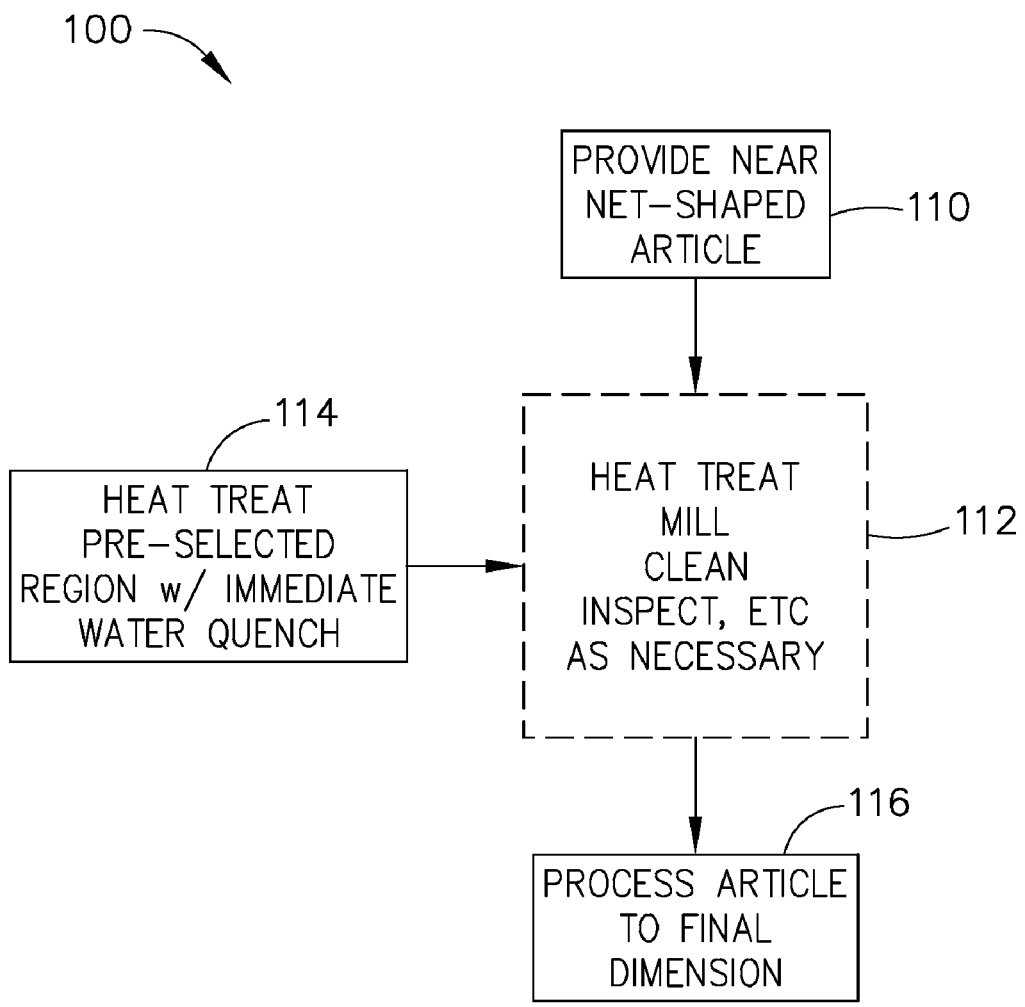
FIG. 8 is a flowchart illustrating an exemplary process.

Following the heat treatment/quench process, the near net shape blade is finished to a final shape. FIG. 8 depicts an exemplary process for achieving the desired microstructure in the airfoil and dovetail. The near net-shaped article is provided following a final forging operation (Step 110). The article is subjected to one or more subsequent processes (Step 112). The subsequent processes may include heat treating, milling cleaning, inspecting etc., as necessary. During or after any of the individual processes provided in Step 112, the unfinished dovetail is subjected to the controlled heat treatment/water quench process to achieve the desired microstructure (Step 114). After hardening of the unfinished dovetail, the article is finished to its final dimension (Step 116). Step 116 may include one or more of broaching, machining, shot peening, plasma coating or other processes known to those with skill in the art.

Exemplary embodiments disclosed here are particularly directed to compressor blades. However, the principles disclosed herein are applicable to other articles and processes where selected hardening is desired.

EXAMPLES

Example 1

Triple Phase Ti442 Fan and Compressor Blade. 1350° F./4-6 hr anneal for airfoil toughness; Heat treat dovetail region at 1600° F.-1750° F. for up to five minutes for fatigue resistance in air or argon atmosphere; Immediate water quench; Vacuum stress relieve at 1020° F. for 2 hrs. Dovetail heat treat accomplished by induction, laser, or electron beam. Hardening occurs throughout dovetail thickness or skin depth. Results: Blade is martensite—OR—bimodal structure at dovetail—AND—alpha+beta in the airfoil. In one embodiment, short induction heating, generally less than 15 seconds, results in skin depth martensitic structure. Induction heating for from 15 to 180 seconds results in a martensitic structure throughout the dovetail thickness. The strength of the dovetail is increased about 30% over comparable unmodified dovetail. For example, an observed Ti442 dovetail hardness increased to 47 Rc from its original 36 Rc (unmodified structure) In an exemplary embodiment, the strength of Ti442 dovetails having a modified microstructure is comparable to Inco 718 alloy. It is contemplated that the stress relieve process may be performed at temperatures from about 1000° F. to about 1200° F.

Example 2

Triple Phase Ti64 Fan and Compressor Blade. 1300° F./2 hr anneal for airfoil toughness; For fatigue resistance, heat treat dovetail region at 1700° F.-1850° F. for up to 5 minutes in air or argon atmosphere; Immediate water quench; Stress relieve at 1020° F. for 2 hrs. Heat treat accomplished by induction, laser or electron beam. Hardening throughout dovetail thickness or skin depth. Results: Blade is martensite—OR—bimodal structure at dovetail—AND—alpha+ beta in the airfoil. An observed Ti64 dovetail hardness increased to greater than 40 Rc from its original (unmodified) hardness.

Example 3

Triple Phase Ti811 Fan and Compressor Blade. 1350° F./2 hr anneal for airfoil toughness/age; For fatigue resistance, heat treat dovetail at 1800° F.-1950° F. for up to 5 minutes in air or argon atmosphere; Immediate water quench; Stress relieve at 1020° F.-1350° F. for 2 hrs. Heat treat accomplished by induction, laser, or electron beam. Hardening throughout dovetail thickness or skin depth. Results: Blade is martensite—OR—bimodal structure at dovetail—AND—alpha+ beta in the airfoil. A preferred stress relief is 2 hrs at 1020° F. after induction hardening. An observed Ti811 dovetail hardness increased to greater than 36 Rc from it original (unmodified) hardness.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method comprising:
   providing a near net-shaped article comprising a body comprising a titanium base alloy and having a first portion and a second portion adjacent the first portion, wherein the near net-shaped article exhibits an alpha+beta microstructure substantially throughout the first and second portions:
   thereafter, processing the second portion to provide a pre-selected region of the second portion with a modified microstructure selected from a martensitic microstructure or a bimodal microstructure without substantially modifying the microstructure of the first portion.

2. The method according to claim 1 wherein providing the near net-shaped article includes providing a near net-shaped fan or compressor blade for a gas turbine engine.

3. The method according to claim 1 wherein providing the near net-shaped article includes providing the first portion encompassing an airfoil region being substantially shaped to an airfoil final dimension and the second portion encompassing an unfinished dovetail region.

4. The method according to claim 1 wherein processing the second portion includes selectively heating at least a surface region of the second portion followed by immediate quenching without substantially heating the first portion.

5. The method according to claim 4 wherein selectively heating at least the surface region of the second portion includes utilizing at least one heating method selected from heating by induction, heating by laser, heating by electron beam radiation, and combinations thereof.

6. The method according to claim 5 wherein the selected heating method includes induction heating under sufficient temperature and time conditions to provide the second portion with a martensitic modified microstructure throughout a thickness of the second portion.

7. The method according to claim 6 wherein a sufficient time is from about 15 to about 180 seconds.

8. The method according to claim 5 wherein the selected heating method includes induction heating under sufficient temperature and time conditions to provide the second portion with a martensitic modified microstructure to a skin depth that is less than throughout a thickness of the second portion.

9. The method according to claim 8 wherein a sufficient time is less than about 15 seconds.

10. The method according to claim 1 further comprising:
    subjecting the near net-shaped article to one or more processes selected from heat treating, milling, cleaning, inspecting prior to or subsequent to providing the second portion with the modified microstructure.

11. The method according to claim 1 further comprising:
    processing at least the second portion of the near net-shaped article to a final body dimension subsequent to providing the second portion with the modified microstructure.

12. The method according to claim 11 wherein processing at least the second portion of the near net-shaped article includes at least one process selected from broaching, machining, shot peening, and coating.

13. The method according to claim 1 wherein the near net-shaped article comprises a titanium alloy.

14. The method according to claim 13 wherein the titanium alloy is selected from Ti442, Ti64, and Ti811.

15. A method comprising:
    providing a near net-shaped article comprising a body comprising a titanium alloy and having a first portion encompassing an airfoil region being shaped to substantially an airfoil final dimension and a second portion encompassing an unfinished dovetail region, wherein the near net-shaped article exhibits an alpha+beta microstructure substantially throughout the first and second portions:
    thereafter, selectively heating at least a surface region of the second portion followed by immediate quenching without substantially heating the first portion to provide a pre-selected region of the second portion with a modified microstructure selected from a martensitic microstructure or a bimodal microstructure without substantially modifying the microstructure of the first portion; and
    thereafter, processing the second portion to a final body dimension.

* * * * *